(12) United States Patent
Eranko

(10) Patent No.: US 6,801,934 B1
(45) Date of Patent: Oct. 5, 2004

(54) METHOD AND DEVICE IN A TELECOMMUNICATION NETWORK HAVING A COMMUNICATION PRODUCT

(75) Inventor: Timo Eranko, Pengerkatu 27 C 63, Fin - 00500 Helsinki (FI)

(73) Assignees: Timo Eranko; Sampo Simojoki

( * ) Notice: Subject to any disclaimer, the term of this patent is extended or adjusted under 35 U.S.C. 154(b) by 637 days.

(21) Appl. No.: 09/608,641

(22) Filed: Jun. 30, 2000

Related U.S. Application Data

(63) Continuation-in-part of application No. PCT/FI00/00314, filed on Apr. 14, 2000.

(51) Int. Cl.⁷ .......................... G06F 15/16; G06F 17/30
(52) U.S. Cl. ...................... 709/217; 709/204; 709/218; 709/219; 707/10
(58) Field of Search ................................ 709/204, 217, 709/203, 205, 218, 219; 707/3, 4, 10

(56) References Cited

U.S. PATENT DOCUMENTS 5,461,390 A * 10/1995 Hoshen ...................... 342/419
5,751,282 A    5/1998 Girard et al.
5,762,552 A    6/1998 Vuong et al.
6,175,833 B1 * 1/2001 West et al. ................. 707/102
6,295,551 B1 * 9/2001 Roberts et al. ............. 709/205
6,400,956 B1 * 6/2002 Richton .................. 455/456.3
6,567,848 B1 * 5/2003 Kusuda et al. .............. 709/219

FOREIGN PATENT DOCUMENTS

| EP | 0 989 712 A2 | 3/1929 |
| EP | WO 9965192 A1 | 12/1999 |
| EP | WO 0018161 A2 | 3/2000 |
| WO | WO 9912100 A1 | 3/1999 |

* cited by examiner

Primary Examiner—Jack B. Harvey
Assistant Examiner—Tam T. Phan
(74) Attorney, Agent, or Firm—Rolf Fasth; Fasth Law Offices

(57) ABSTRACT

The method is performed in a telecommunication network that comprise one or more terminals, a data server and a network interface. The terminal requests a communication product stored in a data server after which the terminal gets access to the requested product. The steps required by the communication product are performed as an interactive real-time communication between the terminal and the data server. The results of the performed steps are then received at the terminal.

12 Claims, 8 Drawing Sheets

Step 1 a) comedy  b) thriller  c) action
d) drama  e) document  f) no restriction

Choice b) and c): 17 matches

Step 2 a) theater A  b) theater B  c) theater C
d) theater D  e) theater E  f) no restriction Choice: b), c), d) and e): 14 matches

Step 3 a) three stars or more  b) four stars of more
b) c) five stars or more  d) no restriction Choice: d): Still 14 matches

Step 4 a) actor 1  b) actor 2  c) actor 3  d) actor 4  e) actor 5
b) f) actor 6  g) actor 7  h) actor 8  i) no restriction Choice: a), b), c), d), e): 9 matches

Step 5

Choose movie
a) film 1  b) film 1  c) film 1  d) film 1  e) film 1
b) f) film 1  g) film 1  h) film 8  i) film 9

FIG. 4

METHOD AND DEVICE IN A TELECOMMUNICATION NETWORK HAVING A COMMUNICATION PRODUCT

PRIOR APPLICATION

This is a continuation-in-part application of PCT/FI00/0314 filed Apr. 14, 2000.

TECHNICAL FIELD

The invention relates to a method and terminal in a telecommunication network and is especially intended to be used for constructing games, tests, and other interactive communication products for a terminal, especially a small mobile station. The invention also relates to a telecommunication network that has a communication product.

BACKGROUND AND SUMMARY OF THE INVENTION

A telecommunication network may consist of a fixed core network and a radio network. The administrators of a telecommunication network are called operators and they offer the services needed for the communication in the network, which in addition to transport services, like radio channels, usually even consist of other communication services such an speech, data, video and multimedia. There are also other service providers than the operators offering different services. These services Ware sent from the core network. Mobile stations belonging to the radio network part of the telecommunication network can make use of such services via radio channels. In the future, different types of services will be transmitted in the same network.

The communication through the computer and telecommunication networks is carried out in accordance with rules called protocols. TCP/IP is an example of a set of protocols used over the Internet, which is the world wide network connecting different networks in the whole world.

Mobile communication and data communication are two very fast growing areas within communication, especially mobile data communication, which includes wireless Internet. The growth in demand for Internet access and intranet services continues to fuel rapid technical adaptation by both implementers and developers. Wireless data communication makes access to Internet and Intranet possible for mobile phones and other mobile devices. More and more innovative service products can now be constructed by means of wireless data communication is to satisfy user needs.

These services can, e.g., be based on the Wireless Application Protocol (WAP), which is a suite of specifications for communication between server applications and client terminals. The WAP specifications cover the micro-browser, scripting, wireless telephony applications (WTA) and a WTA interface to mobile devices, content format for applications and a layered stack, which includes application, cession, transport and security layers. The WAP gateway terminates WAP on the server side. WAP is an open standard that has been optimized for mobile environments with limited bandwidth and small screens. Also other technologies than WAP exist for wireless communication, The objective of a WAP is to provide an open standard for access via a mobile device to the Internet or intranets. Because WAP has been optimized for mobile environments, it makes optimum use of restricted conditions, including small screens, limited device memory and limited bandwidth.

The different speech, data, video and multimedia services might, for example, include information products, interactive courses, films and other amusement products, such as games.

Most games accessed via the Internet are developed for personal computers big screens and intended to be performed at home and they might take several hours to complete, while existing games in mobile phones are programmed in the terminal.

One object of the present invention is to develop a method which can be used to construct communication products suitable for different terminals such as mobile portals, PCs, digital TVs, and especially for mobile terminals with small screens. A more detailed object of the invention is to develop a method which can be used to construct short-termed communication products for mobile terminals with small screens.

The method of the present invention may be performed in a telecommunication network, comprising one or more terminals, a data server and a network interface, and is mainly characterized in that a terminal requesting a communication product stored in a data server after which the terminal may obtain access to the requested product. The steps required by the communication product are performed as an interactive real-time communication between the terminal and the data server. The results of the performed steps may then be received at the terminal.

The telecommunication network of the present invention comprises one or more terminals, a data server and a network interface for the terminals. The terminal may have means for requesting a communication product from a data server, the data server have means for giving access to requested product. The terminal also have means for performing the steps required by the communication product as an interactive real-time communication between the terminal and the data server and means for presenting the result(s) of the performed steps.

The terminal of the present invention may have means for requesting a communication product from a data server, obtaining access to the requested product, performing the steps required by the communication product as an interactive real-time communication between the terminal and the data server, and for presenting the result(s) of the performed steps.

The communication product of the present invention may be characterized in that it can be requested from a data server to the terminal(s), may be accessed at the terminal (s), consists of steps to be performed at the terminal product as an interactive real-time communication between the terminal and the data server, and ends up to produce a result that can be presented at a terminal.

The present invention introduces a new individual feedback technology in real-time for users of wired and wireless internet application.

The present invention has several advantages compared to prior art solutions. Because of its structure, it is very easy for the operator to change the details in the service product and constantly offer new or up-dated versions of the service product to the user, which the user can fetch from the server. The content of the service can therefore be added, changed flexibly or removed very easily. The service provider has thus control over its own service, and changes are easily implemented when required. A WAP-server, WEB-server or other gateway or wireless access server can provide user management and access control. The service provider can charge for the service on the basis of access log, used air time, number of transactions or amount of data transferred. Furthermore, it is question about an interactive and user-friendly product, which enables individual bi-directional real-time connections between user terminals and servers of service providers. The invention makes it possible to give feed-back of the results to the user, which makes the product very individual and personal compared to prior art products. Thanks to the real-time feed-back possibility of the product, it is very useful in lot of different applications, such as for playing games, for participation in tests, gallup investigations and quizzes, and as a follow up management product in project work, in scientific research work, for status and situation reports in military use etc.

In the following, the present invention may be described my means of some embodiment and examples of the invention with reference to illustrative figures. It is clear for one skilled in the art that the architecture and details of the figures can vary within scope of the claims and that some details are presented for illustrative purposes only. Also the example of FIGS. 4 and 5 are only two of endless variations of the communication product.

BRIEF DESCRIPTION OF THE DRAWINGS

FIG. 4 is a schematic summary view of the steps of a method of the present invention;

DETAILED DESCRIPTION

Figure 1:
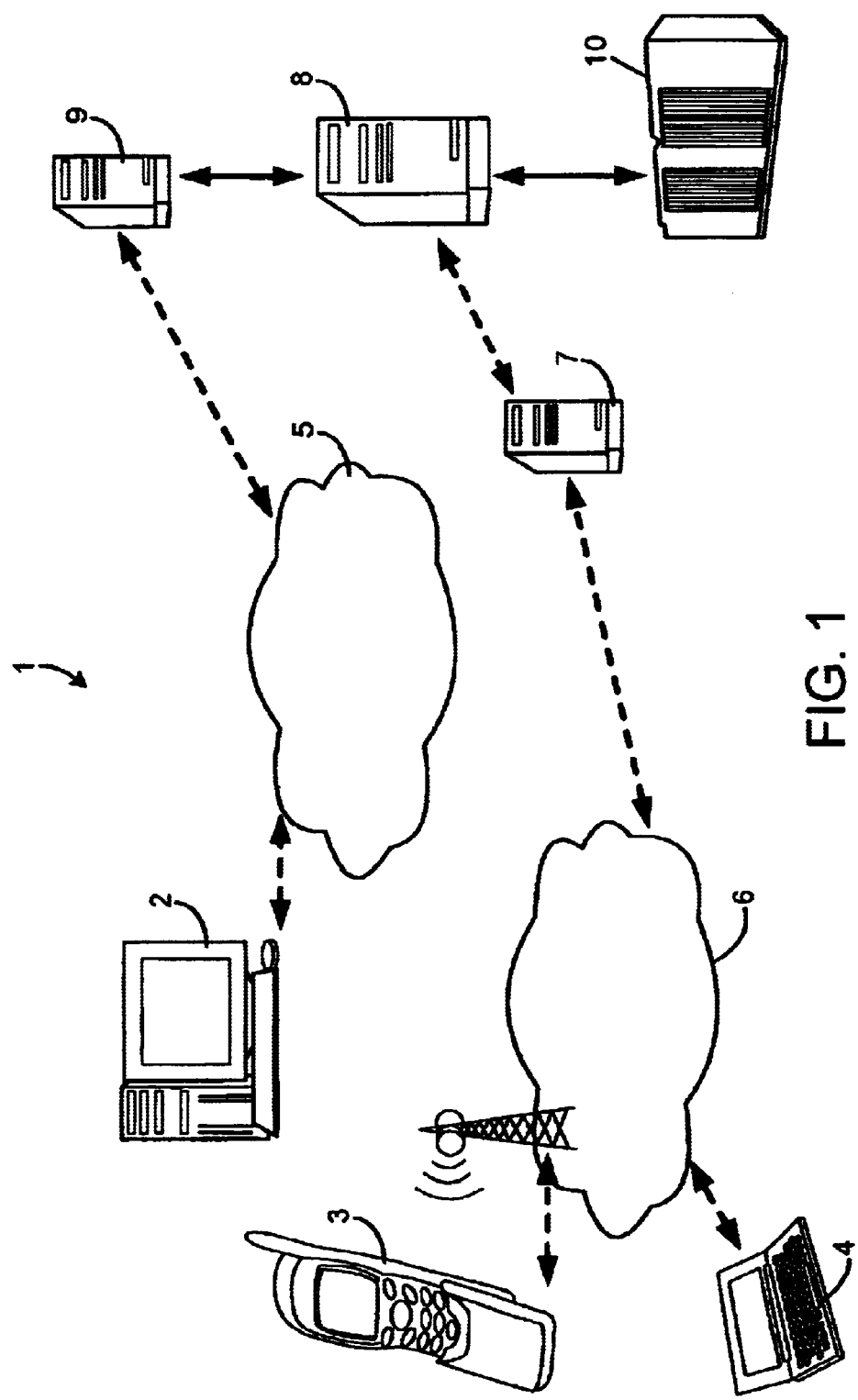
FIG. 1 is a schematic view of the telecommunication network of the present invention.
Figure 2:
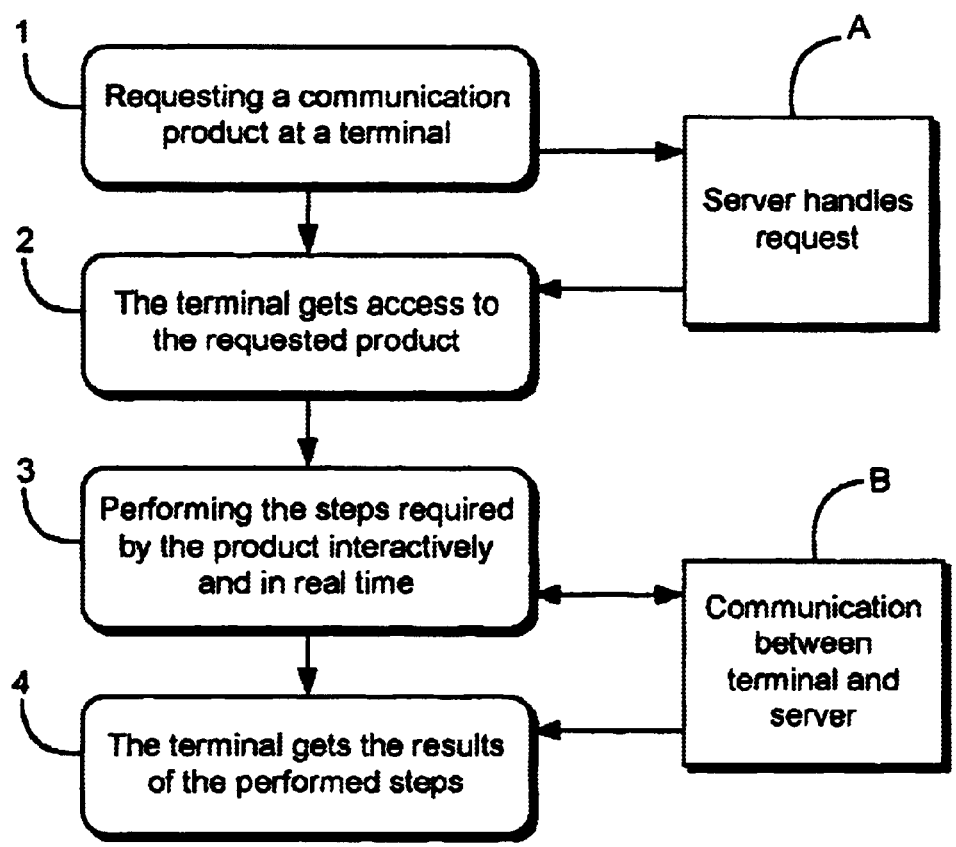
FIG. 2 is a schematic view of a flow diagram of the present invention.

With reference to FIGS. 1–10, the telecommunication network 1 of the present invention comprises one or more terminals, such as a personal computer 2, a mobile phone 3 and a communicator 4 that may be a portable computer. In FIG. 1, the computer 2 may have a direct access to a global network, such as the Internet 5, while the mobile terminals 3 and 4, belonging to an operator network 6, may access the Internet 5 via an access server, such as a WAP-server 7, which is a network interface for the terminals. When the computer 2 uses the services of a data eerier 6, they are accessed through the Internet 5 via a web-server 9. The data server may use a data source 10 for obtaining information depending on the service used. The terminals 3 and 4 may use the services of the data server 8 via the WAP-server 7. Another possibility is that the terminal uses the services of the data server first via the WAP-server 7 and then via the WEB-server 9.

The terminals 2, 3 and 4 may have means for requesting a communication product from the data server 8. The data server 8 or the servers 7 and 9 have means for providing access to the requested product, and for obtaining information from the data source 10. The terminals 2, 3 and 4 have means for performing the steps required by the communication product and for presenting the result(s) of the performed steps.

There are various alternatives, how the access to the communication product saved in the data server can be accessed. The telephone number might, e.g., include the right to the product, e.g., via A-number identification. Alternatively, the request of the terminal 3 to use the communication product of the invention may be handled through many functions in the WAP-server 7. The authentication may take place in the WAP-server, which might also have means for forwarding information to the data server 8 of the technique that is available in the terminal 3 and some details in the communication product are then configured in accordance with that information, such as, e.g., a request for a small screen version, a video version, a non-video version etc. The result of the test can even be presented via a sensor as a physical movement of a terminal part.

The WAP-server can also have billing functions so that the terminal using the service is charged in accordance with use of the communication product. The WEB-server can also have these functions. The method of the invention may be illustrated step by step in the flow scheme of FIG. 2. Steps 1 to 4 are steps from the terminal's point of view and steps A and B are steps from the server's point of view. First, a communication product is required by sending a request for accessing the product from a terminal, as indicated in step 1. The request is in step A handled by the WAP-server or the WEB-server or some other wireless server, which forward the request to the data server together with information of desired details for the service product, such as details of available technology in the terminal requesting the product. In step 2, the servers also allow the terminal to obtain access to the requested product. The communication product consists of several steps to be performed by the terminal in a given way. Examples of product structures are exemplified in FIG. 3. The steps required by the communication product are then performed by the terminal in step 3. Each step is performed as a communication between the terminal and the data server as an interactive real-time and individual communication which is indicated by a double-arrow intended to illustrate all those steps between step 3 and step B. In ease of a structure of FIG. 3, the terminal may choose its way to perform each step among two alternatives which is received by the server. After each step performed, the server may send a new step to be performed to the terminal as a result of the foregoing performed step. After having performed each step, the user may reach a final step which is indicated with an arrow between B and step 4.

After having finished the performance of the steps, the result(s) of the performed steps are presented for the user of the terminal on, e.g., the screen of the terminal, as indicated in step 4. In some advantageous embodiments, also information of results from other terminals that are connected to the same database may be obtained at the terminal.

The communication product of the invention can be structured in different ways. An example is presented in FIG. 3. The communication product is constructed in form of a layered hierarchic structure of steps to be performed by the terminal, wherein the communication begins by performing a step 1 in the highest layer, leading to step 10 or 11 in the second layer depending on in which way step 1 was performed (which one of alternatives 10 and 11 was chosen). Step 10 then leads to step 100 or 101 to be performed in step 3, while step 11 leads to step 110 or 111. These steps then leads to some of the steps 1000, 1001, 1010, 1011, 1100, 1101, 1110, or 1111 to be performed in the next layer 4, the communication ending at a result 10000, 10001, 10010, 10011, 10100, 10101, 11000, 11001, 11010, 11011, 11100, 11101, 11110, or 11111 in the lowest layer 5.

Figure 3:
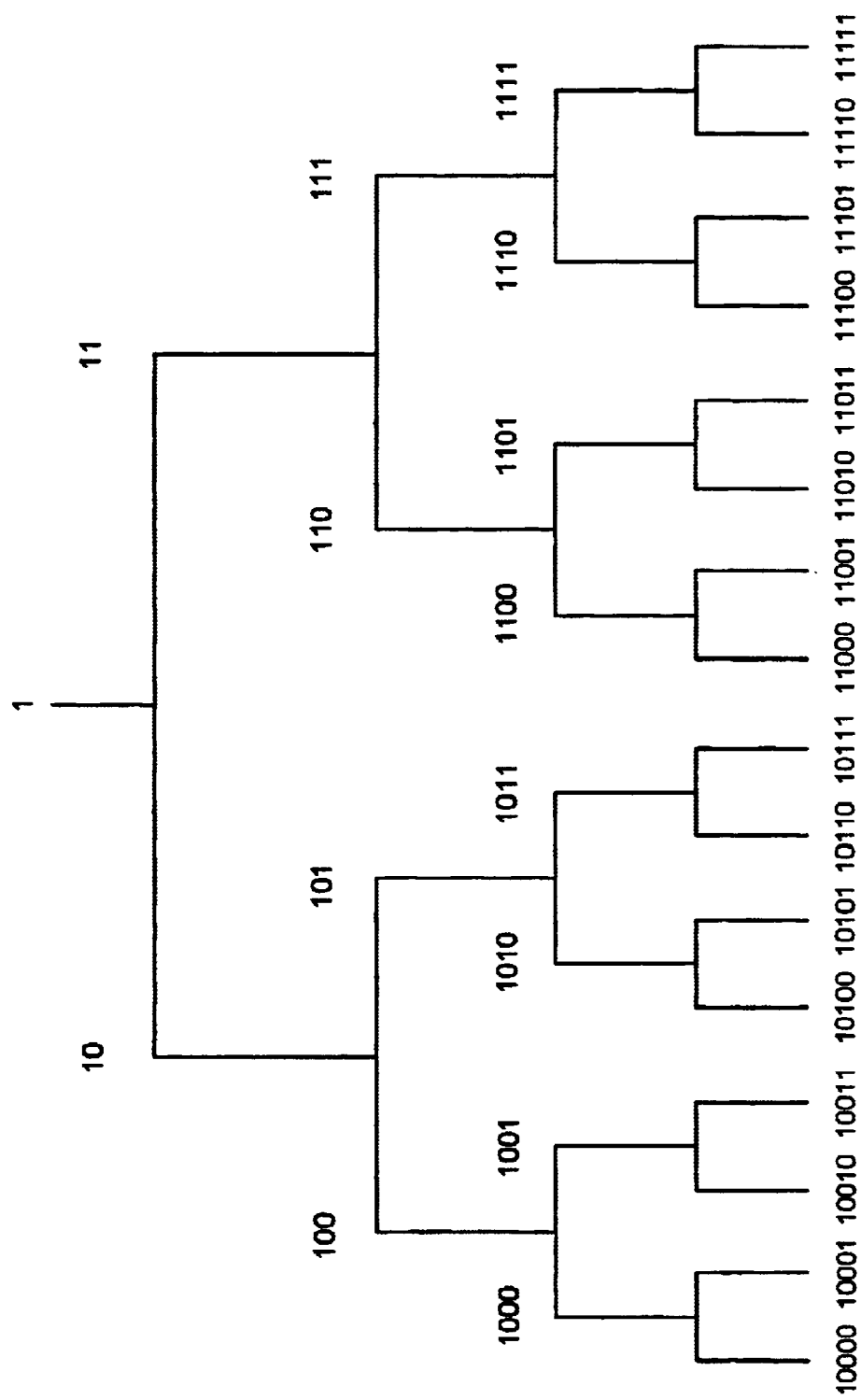
FIG. 3 is a schematic view of a flow diagram of the present invention.

If for example the performing of the steps are intended to take about 2 minutes, it is suitable that there exists 7 layers like that of FIG. 3 in the communication product. After that, the communication product proceeds in accordance with the structure of FIG. 3. This means that, in the communication product, the user can end up to one of 128 end results.

The following three examples illustrates the invention further. It is assumed that a School class of 30 children would like to go together to the cinema in a big city without knowing which films are shown and without being able to agree on a certain movie or without knowing anything about the available movies.

It is also assumed that a service provider, e.g., a service provider managing amusements, has a communication product of the invention, called herein for "Choose Movie", which can be used in this situation to choose right movie of 32 possible movies in the town.

One or more mobile terminals are used to access the communication product in the following steps performed by each user in the class:

Using a mobile terminal to request the communication product, the request containing information about the desired is communication product and the technology available in the terminal;

Handling of the request in a WAP-server, authentication of the request and forwarding it to a data server having the desired communication product;

Sending the first step of the desired "Choose movie" communication product from the data server to the terminal;

Performing first step of the product, by choosing one or more of the following alternatives: a) comedy, b) thriller, c) action d) drama e) document f) no restriction;

Performing second step of the product by choosing one or more of the following alternatives: a) theater A, b) theater B, c) theater C, d) theater D, e) theater E, f) no restriction;

Performing third step or the invention by choosing one or more of the following alternatives with respect to the evaluation of the film in, e.g., newspapers: a) three stars or more, b) four stars or more, c) five stars or more, d) no restriction;

Performing fourth step or the invention by choosing one or more of the following alternatives: a) actor 1, b) actor 2, c) actor 3, d) actor 4, e) actor 5, f) actor 6, g) actor 7, h) actor 8, i) no restriction; and Perform fifth step of the invention by choosing only one of the following alternatives: a) film 1, b) film 2, c) film 3, d) film 4, e) film 5, f) film 6, g) film 7, h) film 8.

The number of movies to choose among depends on the choices made in the foregoing steps. If no restrictions have been made, all movies going in town are available for choice. The restrictions made in the foregoing step are, however, meant to be a help in the choice if a person does not know anything about the movies. Every step depends on the foregoing restrictions, and depending on available movies it might be that the choice already was done before the last step. More or less restriction steps might be included in the "Choose Movie" product and the service provider can change the questions in accordance with what movies are going in the town.

The product can be constructed, e.g., in form of webpages as shown in FIG. 4. It is assumed that in the first step, a person chooses both alternatives "action" and "thriller" in step 1. In the next step 2, the person excludes theater A from the alternatives, the reason for which might be, e.g., that it is a long way from home. In the third step 3, no restriction is made with respect to the evaluation of the film made for example by the newspapers. In step 4, actors 6 and 7 are excluded by choosing actors 1–5 and 8. It is assumed that the result from the first step was movies 1–5, 8–9 and 22–32 (17 matches). The result from step 2 was assumed to be movies 1–5, 8–9 and 22–28 (14 matches). No changes in the results were made with respect to step 3, why the result is still 1–5, 8–9 and 22–29 (14 matches). The choices in the fourth step 4 lead to movies 1–3 and 22 and 25–28 (9 matches). If the person had made more restrictions there would not have been no much choices left in the last step.

The result of the steps, i.e., what movie was chosen by the kid, can in this example be shown on the screen as a video piece of the movie. At the same time, the results of the choices of the other children (those who already performed the steps) are presented as percentages, for example, 11 children chose movie 1, 7 children chose movie 2, 6 children chose movie 3, 2 children chose movie 4, 2 children chose movie 5, 1 kid chose movie 6, and 1 kid chose movie 7.

Movie 1 can, e.g., now be chosen or the communication product can, e.g., be used once more to choose among movies 1, 2 or 3.

A simpler version of the "Choose movie" product would be to build it up in accordance with the structure presented in FIG. 3. Then there would be only two alternatives in each step, successively leading to one possible alternative.

In another example, the communication product may be used to perform a traffic gallup to study how a new bus route should go. The people that participate in the gallup use a personal computer to request the traffic gallup product and perform the steps of the gallup:

Using a PC to request the communication product, the request containing information about the desired communication product and the technology available in the terminal;

Handling of the request in a WEB-server, authentication of the request and forwarding it to a data server having the desired communication product;

Sending the first step of the desired "Traffic gallup" communication product from the data server to the terminal;

Performing first step of the product, by choosing one alternative about how often the possible bus will be used: a) every day, b) at least once a week, c) once a month d) very seldom e) never;

Performing second step of the product by choosing the more important alternative about the destination to reach by the bus: a) Road A, b) road B;

Performing third step of the invention by choosing one or more of the following alternatives: a) road C, b) road D;

Performing fourth step of the invention by choosing one or more of the following alternatives: a) road G, b) road H;

Perform fifth step of the invention by choosing only one of the following alternatives: a) road M, b) road N;

As a result of the performed steps, the desired route for the bus is now presented as a video film, a map or a list of roads at the user's personal computer. There are also shown results of the percentage of other persons that required the same route for the bus.

Figure 5:
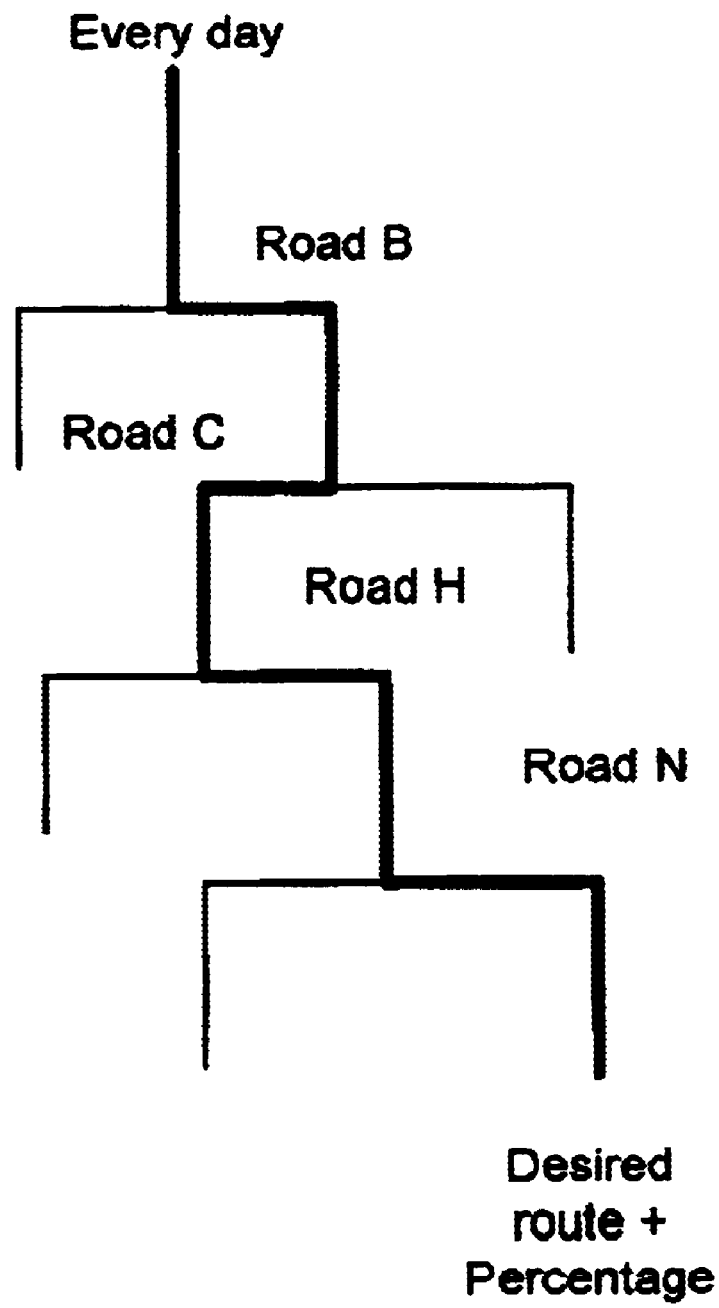
FIG. 5 is a schematic view of the steps of a method of the present invention.

The steps performed in a possible way of this communication product with a structure of FIG. 3 is illustrated in FIG. 5. It is assumed that a person uses the bus every day and has voted for the route Road B-Road C-Road H-Road N for the bus. The desired route can then be shown as a video film on the screen of the PC used or as a map or just as a list depending on the equipment available. Also the percentage of other people having chosen the same route might appear at the screen.

A third example is concerned with a visual presentation of a mobile phone-quiz about choosing a car as seen at the screen of the phone. The following steps are performed:

The mobile user chooses a mobile portal to use the communication product of the invention, which in this example is a quiz about which car would be suitable for his/her needs.

The user makes the request for the quiz, which is stored in a data server and gets access to the requested product.

Figure 6:
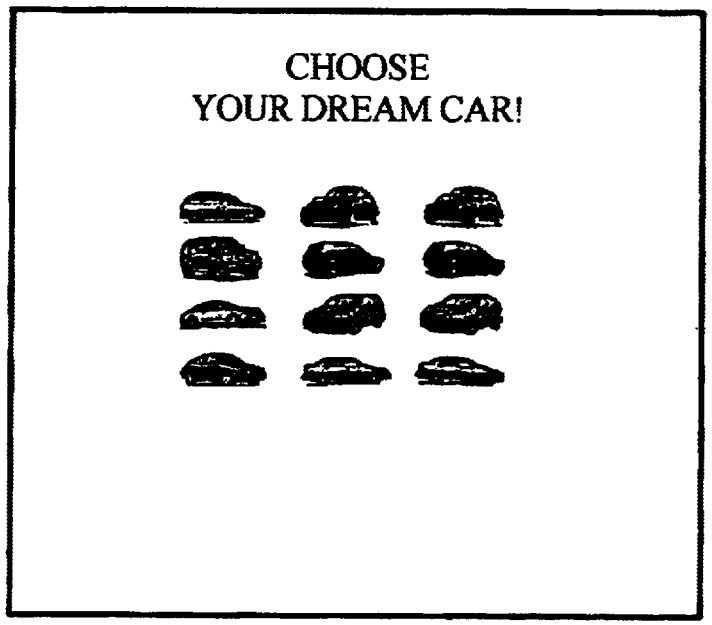
FIGS. 6–9 are display views of sample questions generated by the method of the present invention.
Figure 7:
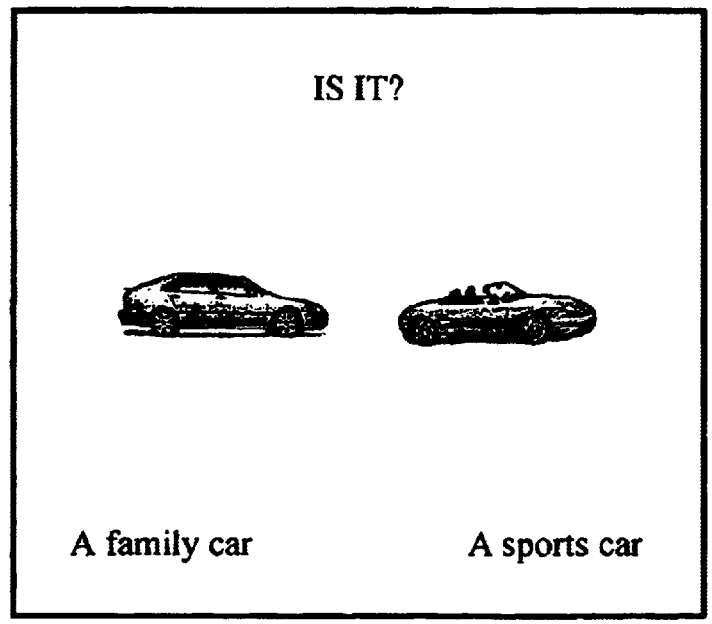

The quiz starts with that a starting picture opens at the screen of the mobile as shown in FIG. 6. By, e.g., clicking at start, the first question and picture appears on the screen and the mobile user has to choose between A or A, as shown in FIG. 7:

1. A: Is it a family car? or B: Is it a sports car?

Figure 8:
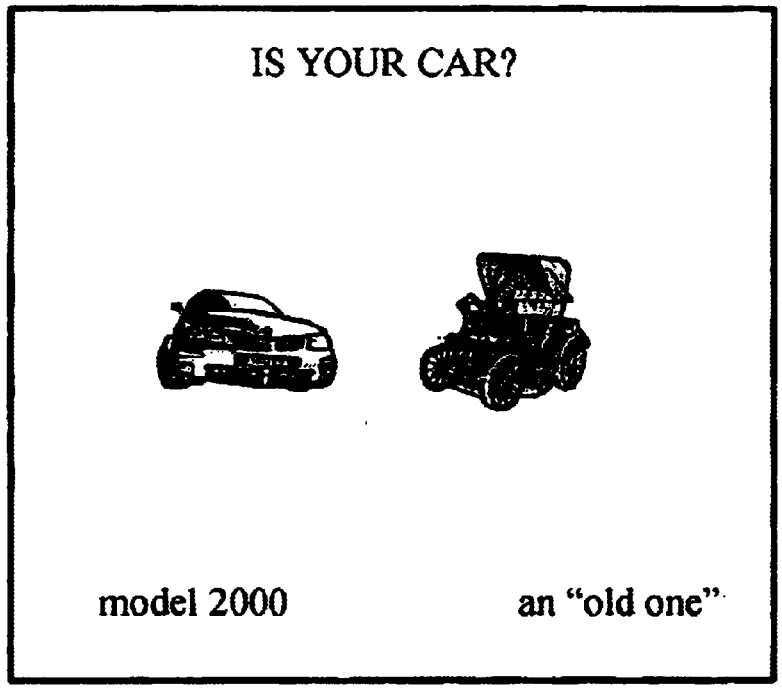

After having answered question 1, the second question and picture appears on the screen and the mobile again user chooses between A or B, as shown in FIG. 8:

2. Is your car A: of model 200? or B: an older one?

After having answered question 2, the third question appears on the screen and the mobile again user chooses between A or B:

3. Do you make your choice on the basis of A: the appearance of the car? or B: strictly by means of rational arguments?

After having answered question 3, the fourth question appears on the screen and the mobile again user chooses between A or B:

4. Is the price of the car? A: less than average, or B: more than average;

After having answered question 4, the fifth question appears on the screen and the mobile again user chooses between A or B:

5. Do you park your car? A: In small spaces, or B in a big garage?;

After having answered question 5, the sixth question appears on the screen and the mobile again user chooses between A or B;

6. Are you more worried about
A: The nature, or B: the price of the gasoline?

After having answered question 9, the seventh question appears on the screen and the mobile user again chooses between A or B;

7. Do you prefer A: a classic style car, or B: an extraordinary car?

Figure 9:
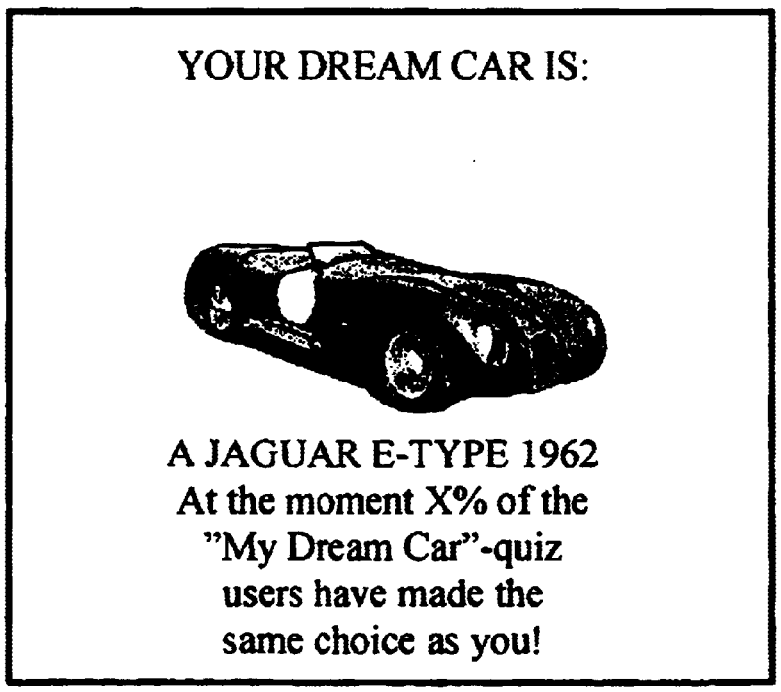

After having answered question 7, the result appears, If the mobile user has chosen for instance 1B/2B/3A/4B/5B/6B/7A, the choice is a Jaguar E-type 1962. There may be another message telling what other mobile users have chosen; Until this moment, X% of other users have made the sane choice as you. Once the mobile user has seen and read the results he/she is asked if he/she wants to have a new try at the quiz, as seen in FIG. 9. This quiz may have the structure shown in FIG. 3.

Figure 10:
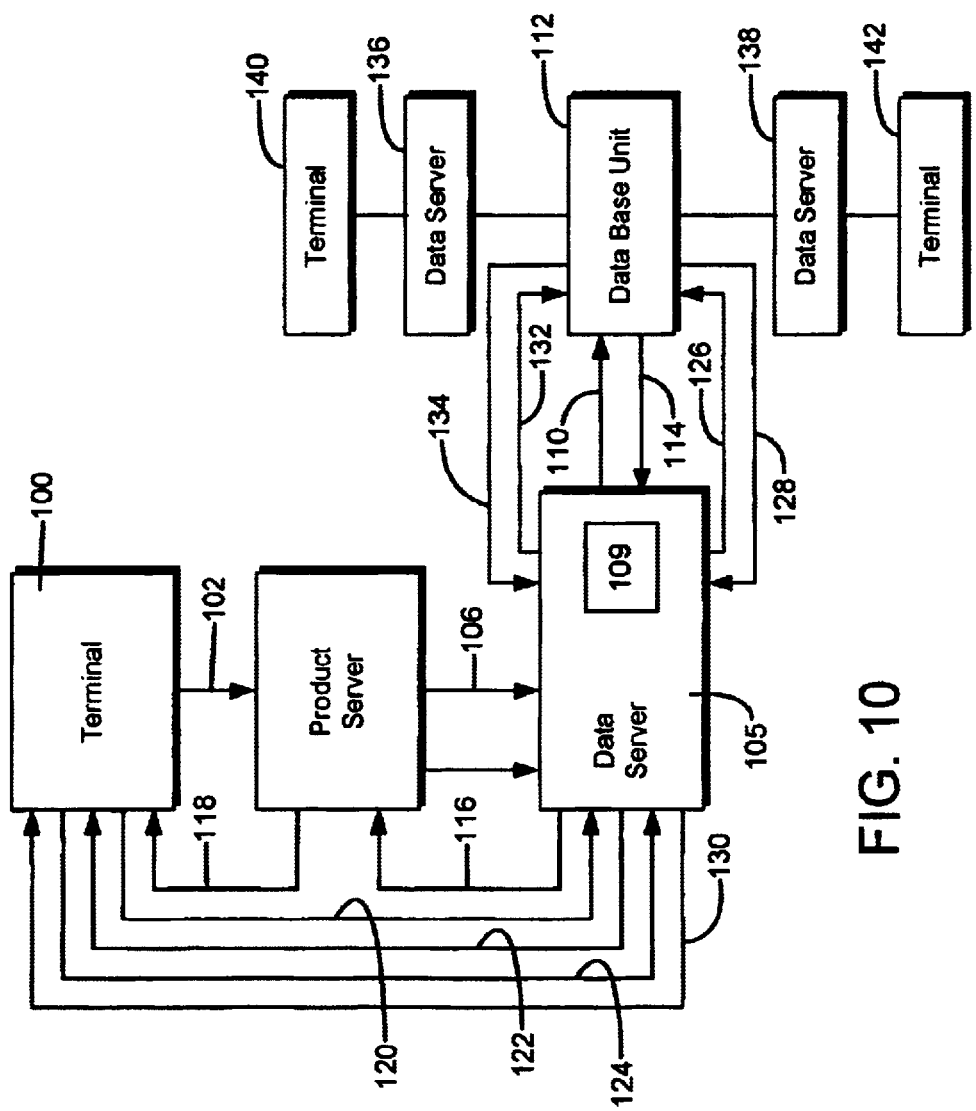
FIG. 10 is a schematic view of the signal flow of the present invention.

FIG. 10 is a schematic flow diagram showing the signal flow of the present invention. A user at a terminal 100 may send a request signal 102 to product server 104. The terminal 100 may be any suitable terminal, including but not limited to, a mobile WAP-phone. The product server 104 may be any suitable server including, but not limited to, a gateway server such as a WAP server or an UMTS-server.

The signal 102 may be a request to obtain access to a communication product such as a computer program or a service. The server 104 receives the signal 102. The server 104 sends an approval request signal 106 to a data server 108. The signal 106 may include the identity or number of the requesting terminal or user and the type of communication product that is requested in the request signal 102. The data server 108 sends a retrieval signal 110 to a data base unit 112. The unit 112 reviews its database to determine if the user is approved to obtain the requested communication product. The unit 112 sends a status signal 114 back to the server 108 with the information regarding whether the request is approved or not. If the status signal 114 includes a reject message, the server sends a reject signal back to the product server 104 that in turn is forwarded back to the terminal 100 to inform the user that the user is not approved to obtain the requested communication product. If the status signal 114 includes an approval message, the server 108 sends an approval signal 116 that includes access to the requested communication product back to the server 104 that in turn sends a product signal 118 including an access code to the communication product to the terminal 100. The requested communication product is now available to the user of the terminal. For example, a starting page may appear on the screen of the terminal 100. There is now a communication link between the data server 108 at which the communication product may be stored.

The user of the terminal 100 may send a starting signal 120 to the server 108 to initiate the communication product. For example, the signal 120 may be sent by clicking on an icon on the terminal screen. If for example, the communication product relates to a game, quiz or any other type of product requiring information from the terminal 100, the server 108 may send a request signal 122 to the terminal 100. The terminal 100 may respond to the signal 122 by sending a response signal 124 to the server with the information requested in the request signal 122. The server 108 receives the response signal 124. An important feature of the present invention is that the server 108 forwards an Information signal 126 including the information in the response signal 124 to the data base unit 112 for storage. The information signal 126 may also include specific profile information of the user of the terminal 100 such as age, values, hobbies, income, group memberships etc. The unit 112 may send a confirmation signal 128 confirming that the information in the signal 126 has been successfully stored. If necessary, the server 108 may send a new request signal 130 back to the terminal 100 to which the terminal may send a response signal. This interchange between the terminal 100, the server 108 and the database unit 112 may go on until all the questions from the server 100 have been answered to by the terminal 100. When all the questions and answers have been communicated, the server 108 may indicate, by for example setting a last signal flag, that a last info ration signal 132 is the last signal. When the unit 112 receives the signal 132 with the last signal flag set, the unit 112 may be triggered to send a final result signal 134 back to the server 108. The signal 134 may include information about how other users that have used or requested the same communication product. The signal 134 may also include information about how other users connected to the database unit 112 have responded to the questions, included in the request signal, that were sent to the terminal 100 by the data server 108.

As best shown in FIG. 10, the database unit 112 may be connected to a plurality of data servers such as data servers 136, 138 that, in turn, may be in communication with terminals 140, 142, respectively. As described in detail above, the unit 112 may communicate with the servers 136, 138 in a similar or exactly the same way as the unit 112 may communicate with the server 108. When the servers 136, 138 have sent the unit 112 the information signals with the last signal flag set, then the unit 112 may send back result signals back to the servers 136, 138 also.

The result signals may include information about how other users of the terminals have responded to the request signals from the data servers. It should be understood that the server 108 may request information about the results from other users without having to send in a last information signal to the unit 112. The communication between the terminals, the servers and the database unit 112 may be an interactive real-time communication. In this way, a user of a terminal may obtain real-time information about the behavior or results of other users of the same database unit 112. For example, the unit 112 may be used to store polling information about current events. In this way, the user of the terminal 100 may obtain statistical information about how other users have voted or answered certain questions before voting or answering herself. In other words, after or before the user has submitted the answers, the user may obtain information about how many others have answered in a certain way or how many others have answered in the same way.

Another important feature of the present invention is that the result signal 134 may be modified in view of the profile of the user of the terminal 100. This modification may be based on the information about the user of the terminal 100 that is included in the information signal 126. The user may specify and only request result information of users that have the same, similar or different profiles and/or responses compared to the profile and responses of the user of the terminal 100. For example, the user of the terminal 100 may request a result signal that only includes the results or responses from individuals who are older than 50 years old and drive a Chevrolet car. The user of the terminal 100 may therefore request results from a sub-group of all the results stored in the database unit 112.

The user of the terminal 100 may also request information about the other users that responded in the same way as the user of the terminal 100 so as to form an interest group. Of course, the operator of the server 108 could also restrict the result signal that is sent to the user of the terminal 100.

The information signal 126 may also include information about the location of the user of the terminal 100. For example, if the terminal 100 is a mobile telephone, the location of the terminal 100 may be included in the information signal that continuously updates the database unit. If may even be possible for the user of the terminal 100 know to learn if another user with the same profile or interests is nearby if the other user's location is known by the database unit. The location may be determined with a positioning such as the Global Positioning System (GPS). For example, the telephone company or operator may have information of the location of its mobile phone customers and the mobile phone customers may give the operator of the mobile phone customer database the permission to store and monitor the location of the mobile phone units.

The user of the terminal 100 may also restrict the access to the user profile information that is stored in the database unit so that only user with, for example, the same profile may access the profile information and possibly the location of the user of the terminal 100.

The user may also submit real questions to the data server to which only the users with the same profile may answer. For example, the user may have an interest in Jaguar cars and only users with the same interest may have access to the question posed by the user of the terminal 100. Users that have the same interest are more likely to know the answer to the question. Of course, the real question may be stored without any restrictions so that anybody that has access to the database may answer the question.

While the present invention has been described in accordance with preferred compositions and embodiments, it is to be understood that certain substitutions and alterations may be made thereto without departing from the spirit and scope of the following claims.

I claim:

1. A method for sending communication in a telecommunication network, comprising:

(a) providing a first terminal in communication with a first data server and a database unit;

(b) the first terminal requesting a first communication product stored in the first data server;

(c) the first terminal obtaining access to the requested first communication product;

(d) the first data server sending a first question signal to the first terminal via the first communication product as a first interactive communication between the first terminal and the first data server;

(e) the first terminal sending a first response signal to the first data server, the first response signal triggering a second question signal from the first data server;

(f) the first data server sending the second question signal to the first terminal via the first communication product as a second interactive communication between the first terminal and the first data server;

(g) the first terminal sending a second response signal to the first data server, the first data server producing a first result on the basis of the second response signal and forwarding a first result signal to a database unit for storage;

(h) a second terminal requesting a second communication product stored in a second data server;

(i) the second terminal obtaining access to the requested second communication product;

(j) the second data server sending a third question signal to the second terminal via the second communication product as a third interactive communication between the second terminal and the second data server;

(k) the second terminal sending a third response signal to the second data server, the third response signal triggering a fourth question signal from the second data server;

(l) the second data server sending the fourth question signal to the second terminal via the second communication product as a fourth interactive communication between the second terminal and the second data terminal;

(m) the second terminal sending a fourth response signal to the second data server, the second data server producing a second result on the basis of the fourth response signal and forwarding a second result signal to the database unit for storage;

(n) the database unit processing the second result signal and sending a comparison result signal to the first data server, the comparison result signal comprising information about third and fourth response signals sent from the second terminal; and (o) the first data server sending the first result signal and the comparison result signal to the first terminal.

2. The method of claim 1 wherein step (b) further comprises sending a request signal to a product server, the product server sending an approval request signal to the first data server.

3. The method of claim 2 wherein the first data server determines if the first terminal is approved to gain access to the communication product.

4. The method of claim 3 wherein first data server sends an approval signal to the first terminal to provide access to the communication product stored in the first data server.

5. The method of claim 1 wherein the method further comprises the first terminal sending a start signal to initiate the first communication product and to establish an interactive real-time communication between the first data-server and the database unit.

6. The method of claim 1 wherein the method further comprises the first data server triggering a last signal flag of the first question signal to request the database unit to send the first result signal back to the first data server.

7. The method of claim 1 wherein the first result signal comprises information from users that match a first profile and excludes users that do not match the first profile.

8. The method of claim 1 wherein the first data server sends a request signal to the database unit to requests information contained in the second result signal received from the second data server.

9. The method of claim 1 wherein the first question signal includes information about a first location of the first terminal.

10. The method of claim 9 wherein the third question signal includes information about a second location of the second terminal and the database unit includes information in the first result signal about the second user if the second location is within a specified distance from the first location and excludes information about the second user if the second location is outside the specified distance.

11. The method of claim 1 wherein the database unit includes information in the first result signal related to the second user if a second profile of second user is identical to a first profile of a first user and excludes information relates to the second user if the second profile is different from the first profile.

12. The method of claim 11 wherein the database unit includes information in the first result signal relating to the second user if the third question signal is identical to the first question signal and excludes information relating to the second user if the third question signal is different from the first question signal.

* * * * *